US007769715B2

(12) United States Patent
Carberry et al.

(10) Patent No.: US 7,769,715 B2
(45) Date of Patent: Aug. 3, 2010

(54) SYNCHRONIZATION OF ACCESS PERMISSIONS IN A DATABASE NETWORK

(75) Inventors: Martin Doston Carberry, Margate, FL (US); Juan B. Miranda-Portillo, Boca Raton, FL (US)

(73) Assignee: International Business Machines Corporation, Armonk, NY (US)

( * ) Notice: Subject to any disclaimer, the term of this patent is extended or adjusted under 35 U.S.C. 154(b) by 313 days.

(21) Appl. No.: 11/378,842

(22) Filed: Mar. 17, 2006

(65) Prior Publication Data
US 2007/0220062 A1    Sep. 20, 2007

(51) Int. Cl.
*G06F 17/00* (2006.01)
(52) U.S. Cl. .................................... 707/618; 709/202
(58) Field of Classification Search ............ 707/1, 707/3, 8, 104.1, 200, 201; 713/201, 202; 709/229
See application file for complete search history.

(56) References Cited

U.S. PATENT DOCUMENTS

| | | | |
|---|---|---|---|
| 6,421,676 B1 | 7/2002 | Krishnamurthy et al. | |
| 6,519,647 B1 * | 2/2003 | Howard et al. | 709/229 |
| 6,981,267 B1 | 12/2005 | Mallet et al. | |
| 7,055,042 B1 * | 5/2006 | Gough et al. | 726/19 |
| 2002/0091748 A1 | 7/2002 | Rehg et al. | |
| 2003/0232616 A1 * | 12/2003 | Gidron et al. | 455/406 |
| 2004/0024894 A1 | 2/2004 | Osman et al. | |
| 2004/0216098 A1 | 10/2004 | Roe et al. | |
| 2004/0236556 A1 | 11/2004 | Lin | |
| 2004/0260948 A1 * | 12/2004 | Miyata et al. | 713/201 |
| 2005/0102554 A1 | 5/2005 | Zohar et al. | |
| 2005/0125508 A1 | 6/2005 | Smith et al. | |
| 2005/0240930 A1 | 10/2005 | Amamiya et al. | |
| 2005/0289547 A1 | 12/2005 | Chan et al. | |
| 2006/0039401 A1 | 2/2006 | Shenfield et al. | |
| 2006/0224620 A1 * | 10/2006 | Silverman et al. | 707/104.1 |

\* cited by examiner

*Primary Examiner*—Apu M Mofiz
*Assistant Examiner*—Anteneh Girma
(74) *Attorney, Agent, or Firm*—Jeffrey N. Giunta; Fleit Gibbons Gutman Bongini & Bianco P.L.

(57) ABSTRACT

A system, method, and computer program product is disclosed for synchronizing access permissions across at least two disparate database systems. A source database system is coupled to a destination database system, using an asynchronous parallel processing system with a set of processing engines whereby each of the processing engines has independent access, separate from each other processing engines, to both the source database and the destination database. A set of self-contained synchronization rules for synchronizing access permissions from the source database system to the destination database system is distributed to execute on the set of processing engines, wherein each of the self-contained synchronization rules are XML formatted data to define a conversion mapping for access permissions from the source database system to analogous access permissions on a destination database and each of the self-contained synchronization rules are able to execute on a processing engine independently.

17 Claims, 6 Drawing Sheets

SYNCHRONIZATION OF ACCESS PERMISSIONS IN A DATABASE NETWORK

FIELD OF THE INVENTION

This invention relates generally to computer networks and more particularly to a method and system for synchronizing access permissions across a disparate database network.

DESCRIPTION OF RELATED ART

Distributed systems, often referred to as "clusters," have the capability of sharing resources among components in the system. A cluster includes operating system instances that facilitate the sharing of resources, such as databases, and collaborate with each other to coordinate and perform system tasks to maximize system resources. To facilitate efficient coordination, schedulers are utilized to distribute jobs among the system resources.

Databases typically require a user to comply with one or more access permissions before data in the database can be accessed by the user. Exemplary access permissions may be full read/write/delete access, read-only access, directory-view-only access, or others. When working with disparate databases of varying types, such as Oracle and DB2, required access permissions may vary between the database systems. For instance, a user may require only "read" access on one database to view a record, but may require both an "access" and a "read" access on a second database to perform the same view of the record. Therefore, synchronization between databases is important, so that a user has parallel access to files of the same security level.

One known method of synchronizing permissions between databases is to program a hard rule for converting between the multiple databases. This method is time-consuming and inflexible. User permission levels change frequently as users are promoted, demoted, terminated, assigned new tasks, etc. Therefore, programming hard rules for access permission conversion is ineffective as soon as a user's permission has changed. Aligning the permission changes between databases may not take place for a relatively long amount of time.

Thus, a need exists for asynchronous permission synchronization for databases which have had their permission policies changed since the previous synchronization.

SUMMARY OF THE INVENTION

Briefly, in accordance with the present invention, disclosed is a system, method, and computer readable medium for synchronizing access permissions across at least two disparate database systems. The invention includes coupling a source database system with at least one destination database system, wherein the source database system and the destination database system have distinct access control mechanisms associated therewith. The invention further includes distributing at least one self-contained synchronization rule for synchronizing access permissions from the source database system to the destination database system to two or more processing engines. The invention also includes retrieving at least one processing rule for at least one of the two or more processing engines based upon the self contained synchronization rule being distributed thereto, and applying the at least one processing rule to at least one record in the at least one destination database system, thereby altering an access control mechanism associated with the at least one record.

In one embodiment, the present invention includes receiving at least one event from the source database system prior to distributing any self-contained synchronization rules to the two or more processing engines. This also includes determining how the self-contained synchronization rule is to be distributed to the processing engines, where the determination is based at least in part on the at least one event received from the source database system. Events can include a user deactivation, a user activation, a user group deactivation, a user group activation, a modified security descriptor, a modified security level, a modified custodian, and others. The event can be received asynchronously in real time.

In an embodiment of the present invention, the at least one self-contained synchronization rule is distributed to the two or more processing engines in conformance with a predefined schedule and/or a predefined mapping rule. The predefined schedule can be based on errors received while previously applying processing rules to the records in the destination database system.

In another embodiment of the present invention the self-contained synchronization rules are distributed to the processing engines based upon an amount of records to be synchronized.

In yet another embodiment of the present invention, the self-contained synchronization rule is distributed to each of at least two processing engines wherein the at least two processing engines are each on a different processing node in a network and the distributing is in response to one of the processing nodes in the network having insufficient resources.

In one particular embodiment of the present invention, the source database system is a records management system and the destination database system is a content management system.

The foregoing and other features and advantages of the present invention will be apparent from the following more particular description of the preferred embodiments of the invention, as illustrated in the accompanying drawings.

BRIEF DESCRIPTION OF THE DRAWINGS

The subject matter, which is regarded as the invention, is particularly pointed out and distinctly claimed in the claims at the conclusion of the specification. The foregoing and other features and also the advantages of the invention will be apparent from the following detailed description taken in conjunction with the accompanying drawings.

DETAILED DESCRIPTION OF THE PREFERRED EMBODIMENTS

Figure 1:
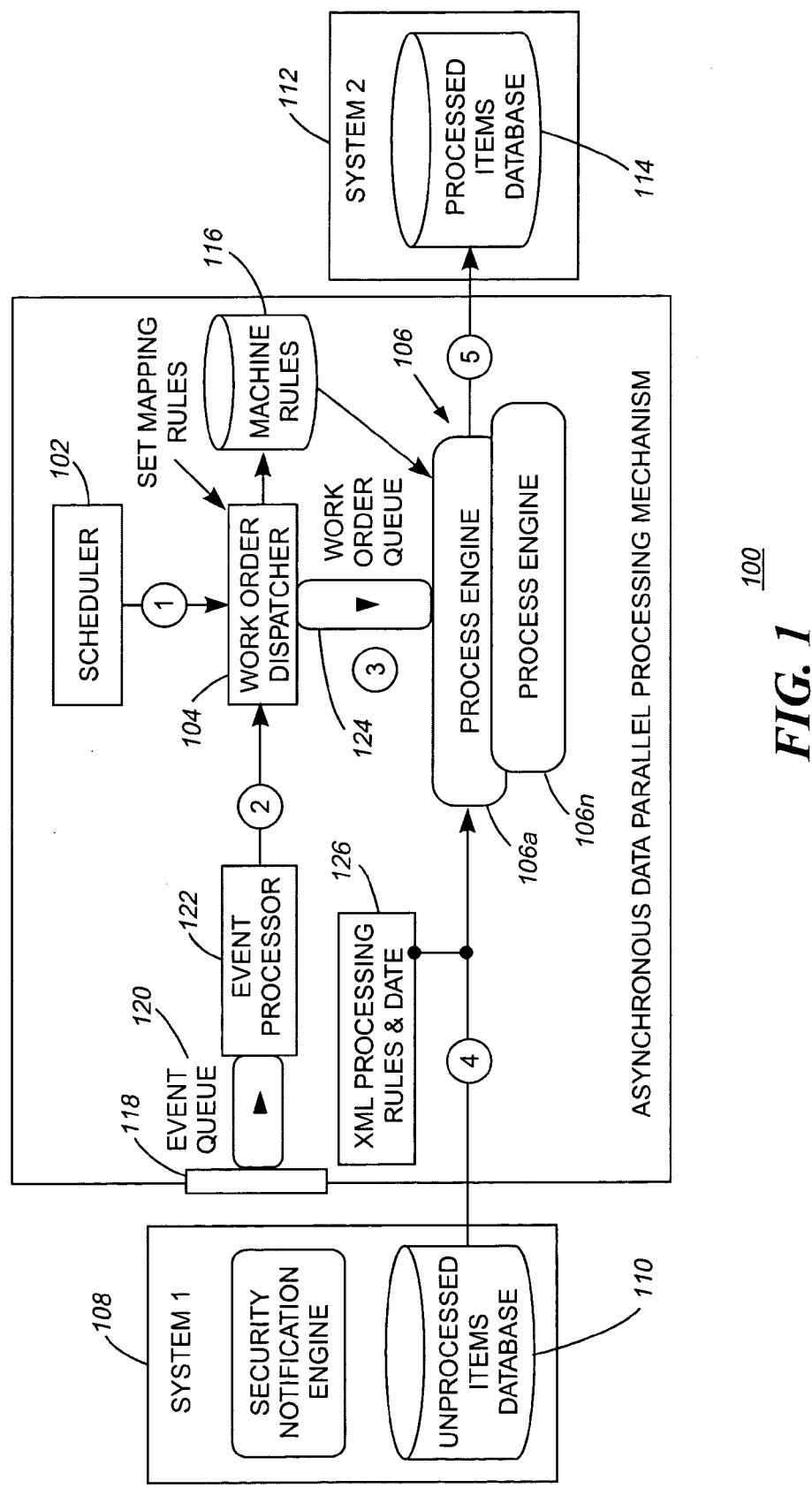
FIG. 1 is a block diagram illustrating a disparate database synchronization system in which an embodiment of the present invention can be implemented.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality. In the drawing like numerals refer to like parts through several views.

The present invention, according to an embodiment, overcomes problems with the prior art by providing a method and system for mapping rules associated with permissions assigned to records in a first database to permissions assigned to records in at least a second database. The present invention also provides a unified structure for automatically performing asynchronous permission synchronization for the latest records that have had permission(s) policy changes after the previous synchronization.

Furthermore, the present invention is fully scalable to provide flexibility when assigning synchronization tasks to process engines. The system provides asynchronous parallel processing on a plurality of machines, depending on the current workload.

Distributed Synchronization System

With reference to FIG. 1, a disparate database synchronization system 100 is depicted in which the present invention may be implemented. The disparate database synchronization system 100 includes is a plurality of connected components in which the present invention may be implemented. In one embodiment of the present invention, the disparate database synchronization system 100 includes a network, which is the medium used to provide communications links between one or more of the connected components. The network may include wired or wireless connections. A few exemplary wired connections are cable, phone line, and fiber optic. Exemplary wireless connections include radio frequency (RF) and infrared radiation (IR), transmission. Many other wired and wireless connections are known in the art and can be used with the present invention. In other embodiments, the components of the present invention reside in a single device and no network is necessary.

In one embodiment of the present invention, one or more of the components of the disparate database synchronization system 100 are connected to other components of the disparate database synchronization system 100 through a wide area network. Wide area networks typically includes various network devices such as gateways, routers, hub, and one or more local area networks (LANs) that are interconnected with various media possibly including copper wire, coaxial cables, fiber optic cables, and wireless media. Wide area networks may represent or include portions of the Internet. As is known in the art, the Internet includes a backbone of high-speed data communication lines between major nodes or host computers, consisting of thousands of commercial, government, educational and other computer systems that route data and messages. In another embodiment of the present invention, the disparate database synchronization system 100 is implemented as one or more types of networks, such as for example, an intranet, a local area network (LAN), or a wide area network (WAN).

As shown in FIG. 1, one of the components of the disparate database synchronization system 100 is a scheduler 102. The scheduler 102 holds scheduling information for starting a synchronization process according to the present invention. In many instances, a synchronization process or "job" will require considerable system resources. For this reason, it is often desirable to schedule synchronizations at times when demand on system resources is otherwise low, such as at night or on weekends.

The scheduler 102 is communicatively coupled to a work order dispatcher component 104. When the time arrives, the scheduler kicks off the work order dispatcher component 104. The work order dispatcher 104 is responsible for distributing work orders amongst a pool 106 of process engines 106a-n. The work orders may include pre-defined synchronization rules and sequence of records to be used for synchronizing access control with the self-contained synchronization, i.e., access permissions, between a source database system 108 (containing a source database 110) and a destination database system 112 (containing a destination database 114). The term "self contained," as used herein, means that the rule does not need any other data to execute.

The delegated work from the work order dispatcher component 104 intended for the process engine(s) 106a-n is delivered to a "work-order" queue 124 and subsequently processed in parallel with other process engine objects. In one embodiment of the present invention, the process engine objects all run in the same system-node. In other embodiments, the process engine objects are run horizontally in two or more processing nodes capable of handling a particular work-order delegation/request. A work-order, in one embodiment, is contained in a serializable object holding reference to the work items requiring synchronization.

When a process engine (from the pool 106) receives a work order from the work order dispatcher 104, this order tells the process engine how many and the sequence (e.g., from record# 2000 to record# 3000—in that order) of a set of electronic records to process. Upon receipt of a work-order, the process engine 106 proceeds to fetch the work items from the source database system 108. In one embodiment of the present invention, the data retrieved from the source database system 108 is combined with XML formatted data and processing rules 126. The processing rules 126 define the conversion mapping for access control permissions on the source database system 108 to analogous access control permissions on a destination system 112. The process engine(s) 106a-n utilizes a set of synchronization or "mapping" rules 116, that were previously created, for mapping access permissions from the source database system 108 to privileges for the destination database system 112. The process engine(s) 106a-n parse the XML formatted data 126 associated with the items it has fetched from the source system and proceeds to apply the rules for each item in the XML document for the target database system 112.

Figure 2:
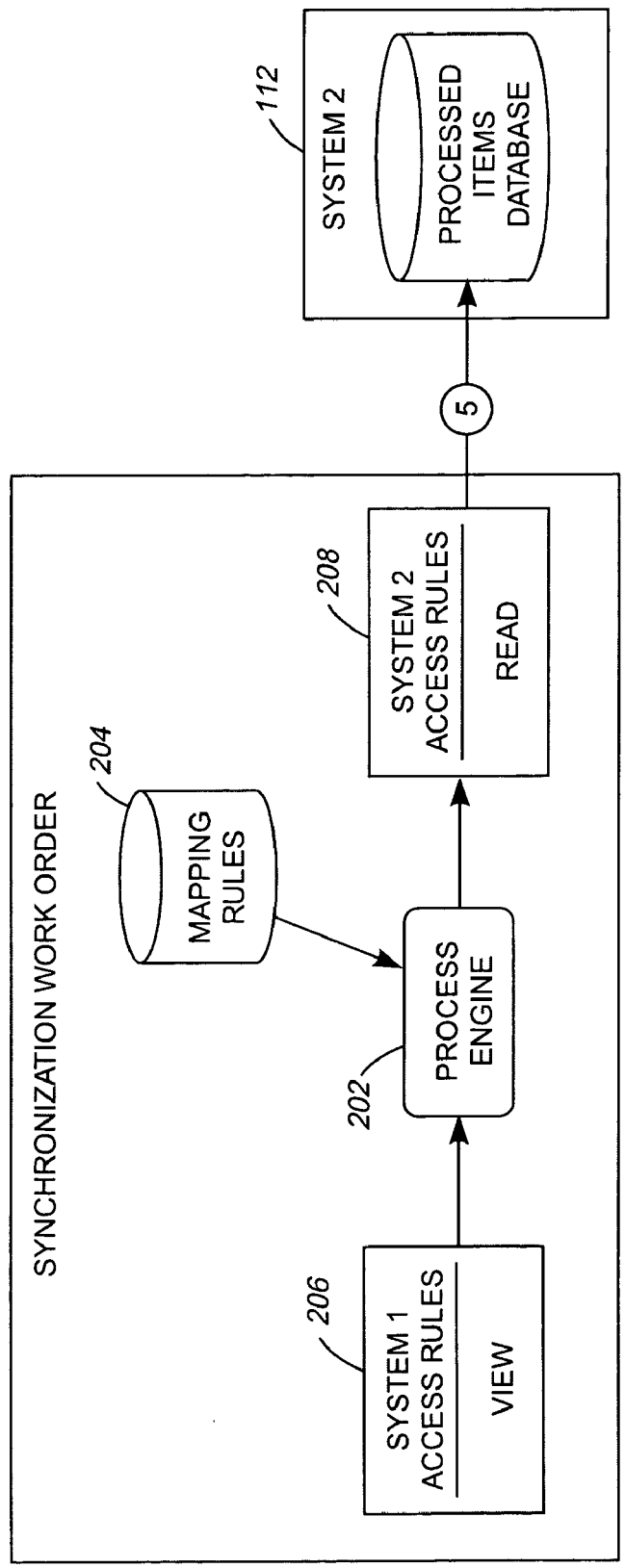
FIG. 2 is a block diagram illustrating one embodiment of a system diagram of a synchronization work order being executed in accordance with an aspect of the present invention.

FIG. 2 shows a system diagram of a synchronization work order being executed. In FIG. 2, a process engine 202 uses one or more mapping rules 204 to map a user access rule of "view" in a source database system 206 to a user access rule of "read" in a destination database system 208 and creates a resulting "object" with "self-contained" information to be applied to the destination database system 208. "Self-contained," as used herein, means not requiring additional or external information.

Synchronizing of access permissions between disparate database systems according to a defined schedule has been described above. However, in practice it has been found that changes in permission levels in the source database need to be reflected in the destination database prior to the next scheduled synchronization.

A. Events

"Events" are activities that alter a user's or group of users' access permission status. Such events include deactivation or activation of a user on the system, deactivation or activation of a group of users on the system, a modified security descriptor, a modified security level, a modified custodian, and others. At any time while the above-described scheduled synchronization process is being carried out, unscheduled asynchronous events may occur at the source database system 108. Any events concurrently sent by the source system 108 are passed through a parallel processing mechanism 118 that includes an asynchronous interface. The interface allows the parallel processing mechanism 118 to receive events from the source database system 108 in real time.

The concurrently sent events are received by an event queue 120. These events persist with an event processor 122 and serve as additional control logic that the work order dispatcher component 104 can use when delegating work to process engine(s) 106a-n. However, it should be noted that the work order dispatcher component 104 may not factor the event in when dispatching. This may be because the synchronization is already scheduled of the event is not an event that must be updated prior to the scheduled synchronization.

B. Event Work Orders

The delegated event work from the work order dispatcher component 104 intended for the process engine(s) 106a-n is, in the case of event work orders, asynchronously delivered to a "work-order" queue 124 and subsequently processed in parallel with other process engine objects. In one embodiment of the present invention, the process engine objects all run in the same system-node. In other embodiments, the process engine objects are run horizontally in two or more processing nodes capable of handling a particular work-order delegation/request. A work-order, in one embodiment, is contained in a serializable object holding reference to the work items requiring synchronization.

The advantage of utilizing event work orders is shown in the following example. Suppose a user (user A) that is a member of the source database 110 gets deleted, i.e., got fired or left the organization. Because of the deleting event, an event notification is sent through the parallel processing mechanism 118 to the event processor 122 and to the work order dispatcher 104. Upon receipt of this event, the work order dispatcher 104 simply creates the order and gives it to a process engine in the pool 106. The event work order contains the fact that user A's access should be removed from any records or items already processed in the receiving database system 112 to which user A is previously assigned access. User A's access is subsequently removed from both of the databases 110 and 114.

C. Implementation

In one embodiment, the present invention is implemented entirely as J2EE Enterprise Components and deployed in the WebSphere Application Server running in the EJB container and written in the Java programming language. However, the invention can also be implemented and deployed using other devices, for instance, Enterprise Application servers, such as the BEA WebLogic server.

In one embodiment of the present invention, the event queue 120 and work-order queue 124 implement a point-to-point event delivery scheme using JMS (Java Messaging System) technology.

D. Clusters

Figure 5:
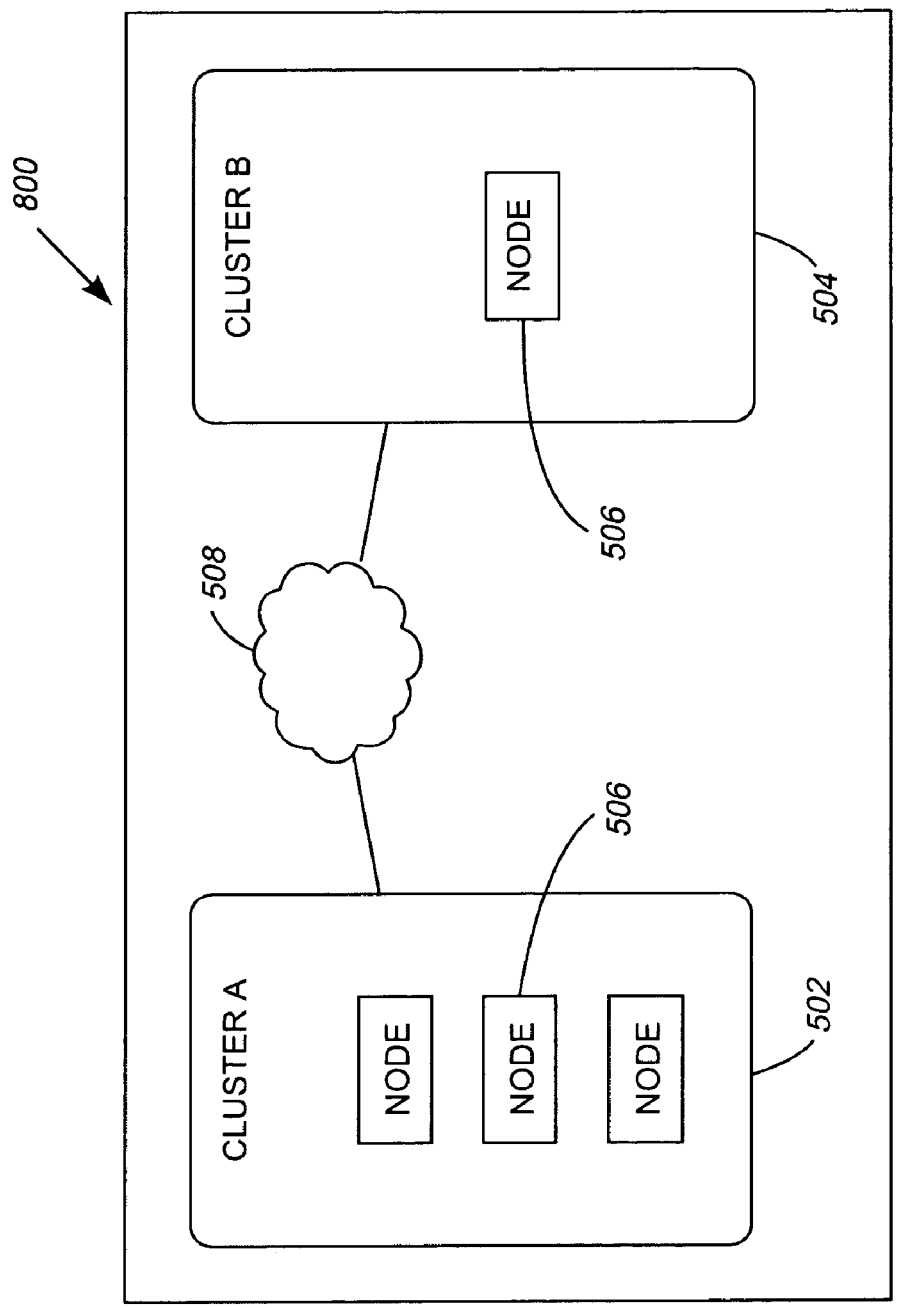
FIG. 5 is a block diagram illustrating one embodiment of a computing environment having a plurality of clusters, in accordance with an aspect of the present invention.

A distributed computing environment, which has the capability of sharing resources, is termed a cluster. In particular, a computing environment can include one or more clusters. For example, as shown in FIG. 5, a computing environment 500 includes two clusters: Cluster A 502 and Cluster B 504. Each cluster includes one or more nodes 506, which share resources and collaborate with each other in performing system tasks. One of the clusters can be communicatively coupled to the cluster through a wide area network 508. The process engine(s) 106 of the present invention can be deployed to any node in a cluster for horizontal scalability or for handling fail-over.

The work-order dispatcher "persists" the work items currently ordered to support fail-over. In this case, the term "persists" indicates the characteristic of data that outlives the execution of the program that created it: which is achieved in practice by storing the data in non-volatile storage such as a file system or a relational database. Without this capability, data structures only exist in memory, and will be lost when a program exits. Persistence allows, for example, a program to be restarted and reloaded with the data structures from a previous invocation of the program.

An Enterprise JavaBean (EJB) specification is one of the several Java APIs in the Java Platform, Enterprise Edition. EJB is a server-side component that encapsulates the business logic of an application. A Message Driven Bean (MDB) is an Enterprise JavaBean (EJB) similar to a session bean, except it responds to a JMS message rather than an RMI event. In one embodiment of the present invention, the event processor(s) 106a-n are implemented as a Message Driven Bean (EJB) for receiving asynchronous events from the source system. In this embodiment, the scheduler 102 is a timer java bean, the work order dispatcher 104 is a Stateless (EJB) and the process engine(s) 106a-n are implemented as a Message Driven Bean (EJB). Data base access is abstracted by an interface provided by the source database system 108 and the destination database system 112, respectively. Thus making the invention agnostic to data access implementation details. It should also be noted that the invention is not limited to the specific implementations above and can any one or a combination of these embodiments.

E. Deployment

In one embodiment of the present invention, the process engine(s) 106a-n are deployed to any node in a cluster using WebSphere Network Deployment to support fail-over and scalability. This network deployment utilizes JMS clustering (e.g. WebSphere ND 6.0) and the definition of an Enterprise Service Bus with a Cluster Data Source for persisting work-order events sent by the work order dispatcher 104 to the work order queue 124.

F. Scalability

Figure 4:
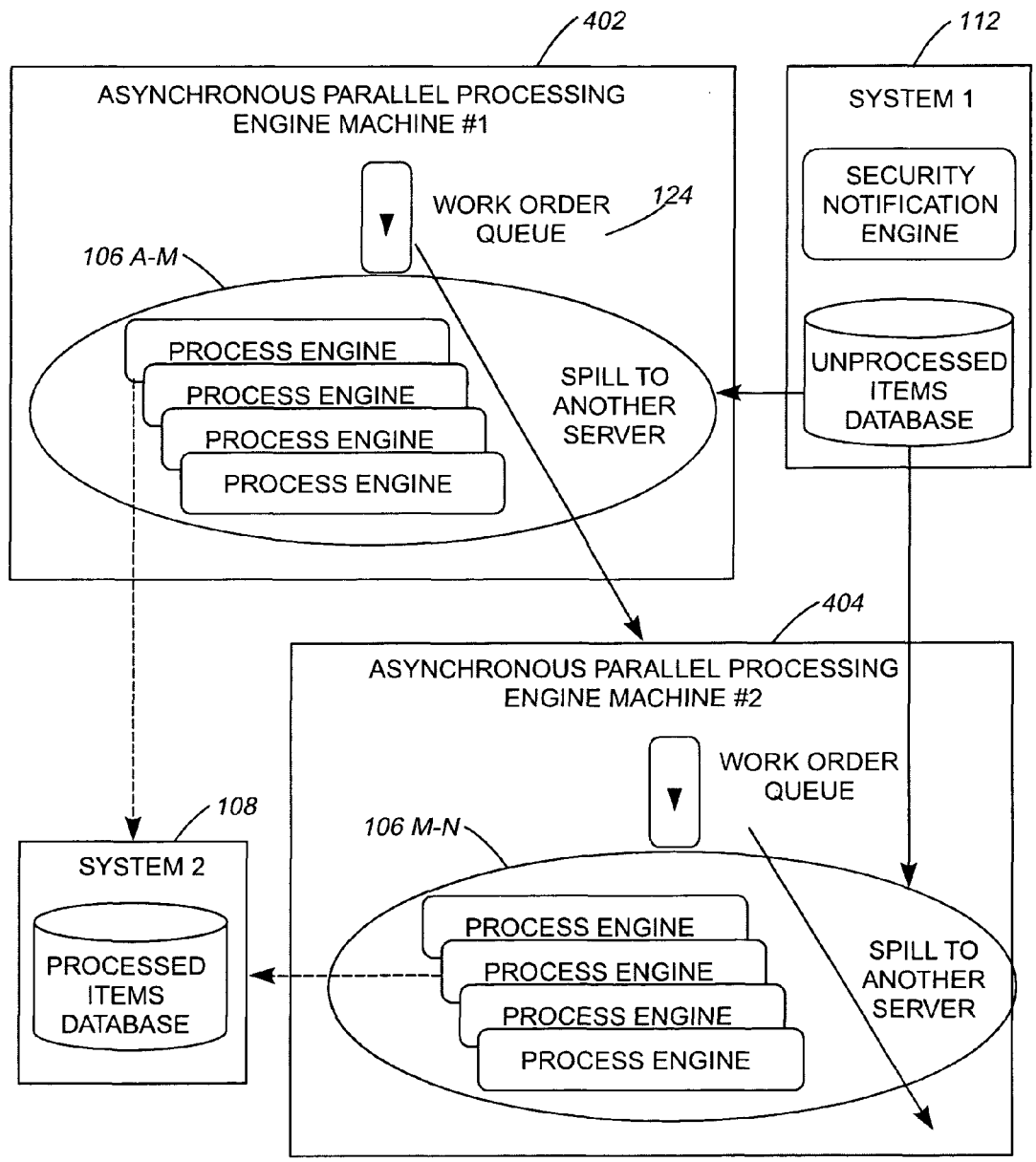
FIG. 4 is a block diagram illustrating the scalability of a disparate database synchronization system, according to an embodiment of the present invention.

As shown in FIG. 4, the present invention is able to scale up when work orders are pushed into the work order queue 124 and the current node 402, which contains process engines 106a-m, where m<n, does not have the resources to handle the asynchronous request. Thus the invention "spills" the request horizontally to the next node 404 in the cluster where the process engine(s) 106m-n have been deployed.

In disparate database synchronization systems, multiple components can be used and the present invention is not limited to any particular number of components. Each component may be, for example, a personal computer or a networked computer. A network computer is any computer, coupled to a network, which receives a program, data, or other application from another computer coupled to the network either permanently or temporarily.

The present invention can be used with heterogeneous or homogeneous systems. The term "heterogeneous" is commonly used to describe an environment in which the individual devices can have different hardware, application stacks, operating systems, and more. Conversely, the term "homogenous" is used to describe an environment in which the individual devices have similar hardware, application stacks, operating systems, and more.

G. Nodes

Figure 3:
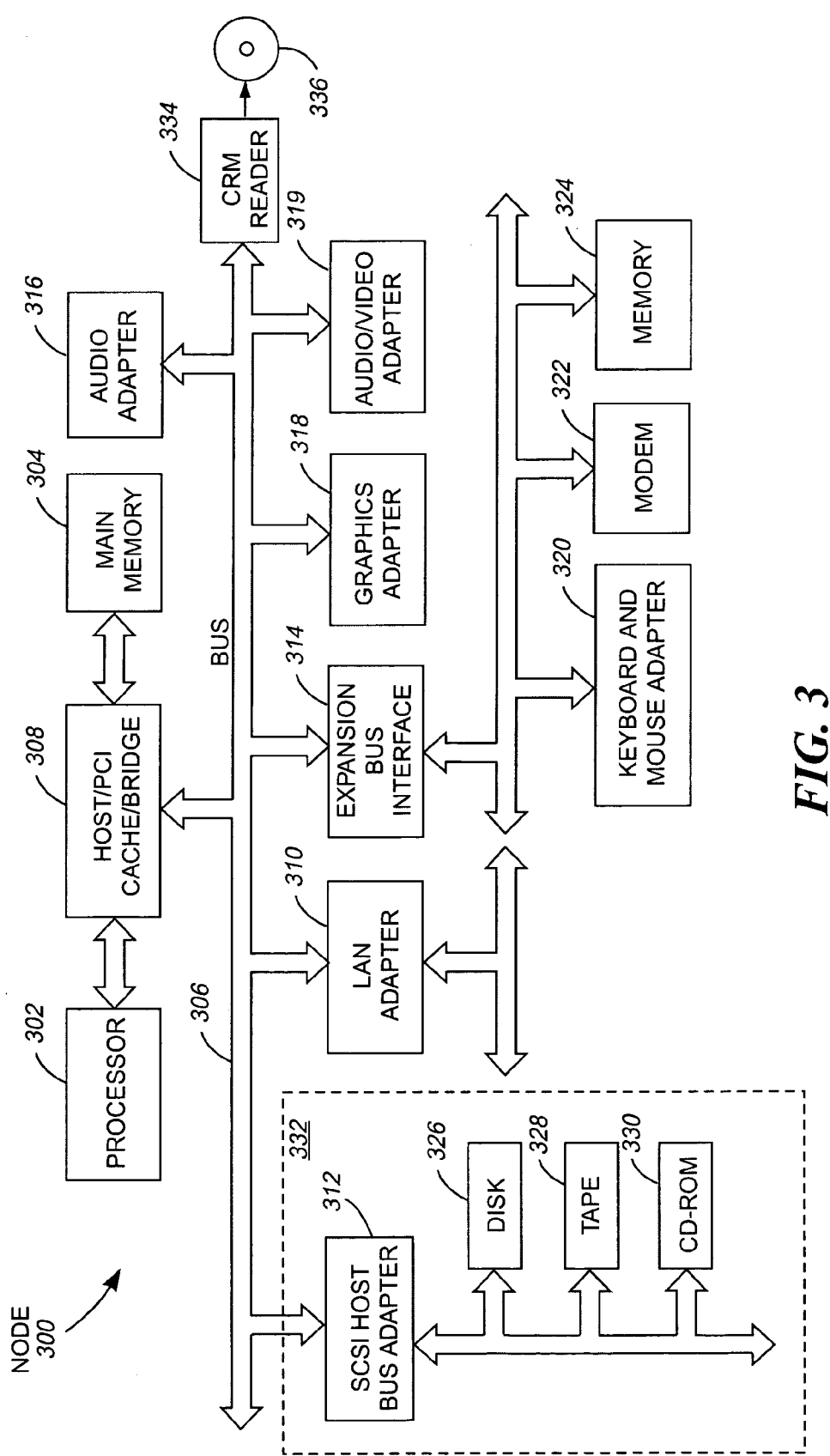
FIG. 3 is a block diagram illustrating a data processing system that may be implemented with the present invention according to embodiments of the present invention.

Referring now to FIG. 3, a block diagram illustrating a node information processing system, in accordance with one embodiment of the present invention, is shown. The node information processing system 300 is a data processing system that employs a peripheral component interconnect (PCI) local bus architecture. It should be noted that alternate bus architectures, such as Micro Channel and ISA, may also be used. A processor 302 and a main memory 304 are connected to the PCI local bus 306 through a PCI bridge 308. The PCI bridge 308 may also include an integrated memory controller and cache memory for processor 302. Additional connections to PCI local bus 306 may be made through direct component interconnection or through add-in boards. In one embodiment of the present invention, a local area network (LAN) adapter 310, a SCSI host bus adapter 312, and an expansion bus interface 314 are connected to the PCI local bus 306 by direct component connection. In contrast, audio adapter 316, graphics adapter 318, and audio/video adapter 319 are connected to PCI local bus 306 by add-in boards inserted into expansion slots. The expansion bus interface 314 provides a connection for a keyboard and mouse adapter 320, a modem 322, and additional memory 324. The SCSI host bus adapter 312 provides a connection for hard disk drive 326, tape drive 328, and CD-ROM drive 330. Additional PCI expansion slots or add-in connectors can also be supported.

Those of ordinary skill in the art will appreciate that the hardware shown in FIG. 3 is exemplary and hardware used in other embodiments may vary from that shown in FIG. 3 and described above, depending on the implementation. Additionally, the processes of the present invention may be applied to a data processing system 300 having two or more multiprocessors.

In one embodiment of the present invention, the node information processing system 300 is configured as a network computer and, therefore does not have or require a SCSI host bus adapter 312, a hard disk drive 326, a tape drive 328, or a CD-ROM 330, all denoted by a dotted line 332 in FIG. 3. In this embodiment, the client computer includes some type of network communication interface, such as a LAN adapter 310, a modem 322, or the like.

H. Software and Computer Program Medium

In one embodiment of the present invention, a device 334, such as a CDROM drive, capable of reading a computer-readable medium 336, is connected to the PCI local bus 306. In this document, the terms "computer program medium," "computer-usable medium," "machine-readable medium," "computer program product" and "computer-readable medium" are used to generally refer to media such as non-volatile program memory, data memory, removable storage drive, a hard disk installed in a hard disk drive, and signals. These computer program products are means for providing software to the node information processing system 300. The computer-readable medium allows the node information processing system 300 to read data, instructions, messages or message packets, and other computer-readable information from the computer-readable medium. The computer-readable medium, for example, may include non-volatile memory, such as floppy, ROM, flash memory, disk drive memory, CD-ROM, and other permanent storage. It is useful, for example, for transporting information, such as data and computer instructions, between computer systems.

Various software embodiments are described in terms of this exemplary system. After reading this description, it will become apparent to a person of ordinary skill in the relevant art(s) how to implement the invention using other computer systems and/or computer architectures.

I. Operating System

The processor 302 is utilized to run an operating system that coordinates and controls various components within the data processing system 300 in FIG. 3. One example of an operating system is OS/2, which is commercially available from International Business Machines Corporation. "OS/2" is a trademark of International Business Machines Corporation. Additionally, an object-oriented programming system such as Java may run in conjunction with the operating system and provides calls to the operating system from Java programs or applications executing on the data processing system 300. "Java" is a trademark of Sun Microsystems, Inc. Instructions for the operating system, the object-oriented operating system, and applications or programs are located on storage devices, such as hard disk drive 326, and may be loaded into the main memory 304 for execution by the processor 302.

Figure 6:
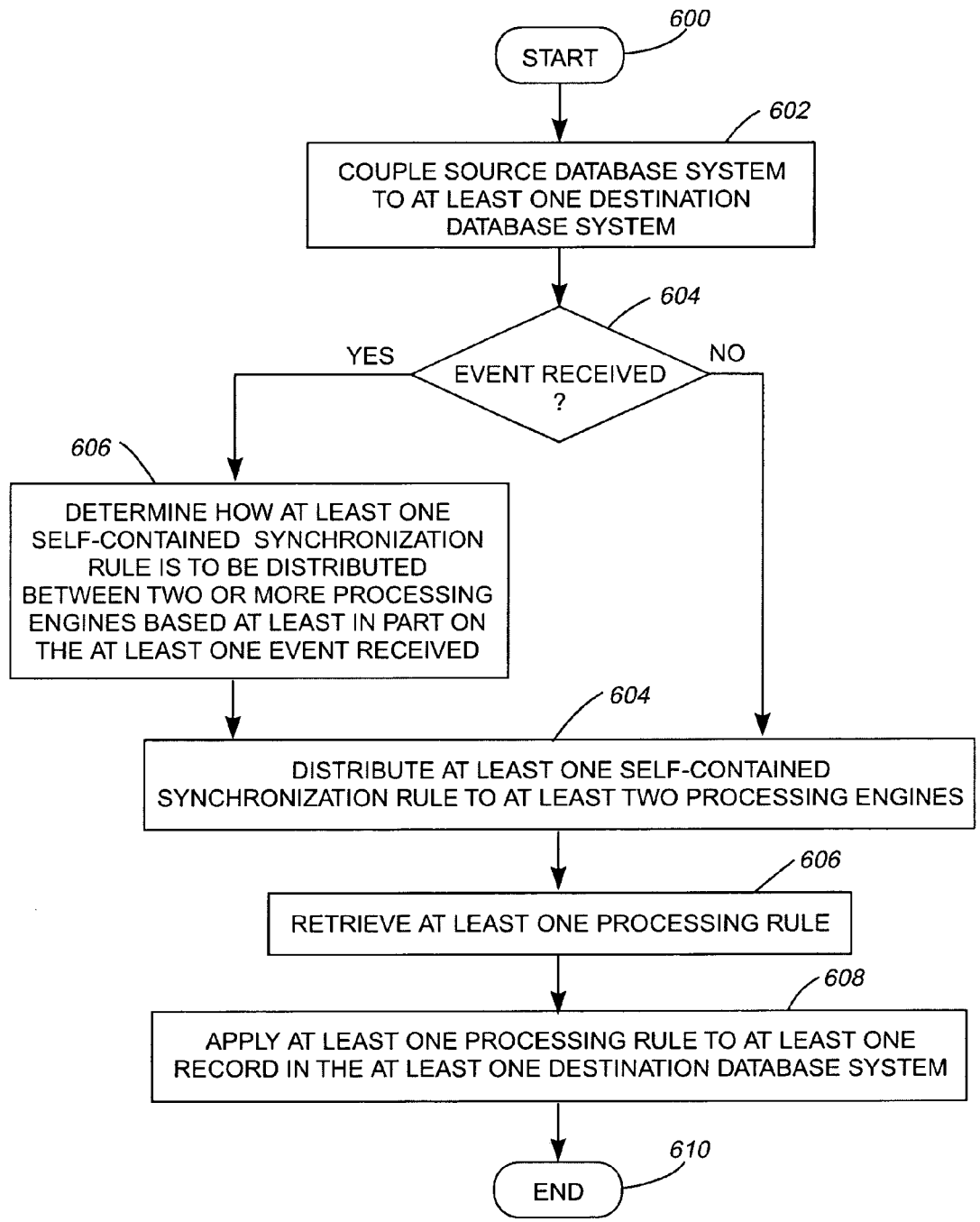
FIG. 6 is a process flow diagram of a disparate database synchronization system, according to an embodiment of the present invention.

With reference to FIG. 6, a flow chart of the synchronizing process, according to the present invention, is shown. The flow begins at step 600 and moves directly to step 602 when a scheduler indicates that the process should begin. In step 602, a source database system is coupled with at least one destination database system. In step 604 a determination is made as to whether or not an event is received from the source database system. If the answer is yes, the flow moves to step 606, where a determination is made as to how the at least one self-contained synchronization rule is to be distributed between processing engines, where the decision is based at least in part on the at least one event received from the source database system. The flow then moves to step 608. If the answer to step 604 is no, the flow moves to step 608. In step 608, at least one self-contained synchronization rule for synchronizing access permissions from the source database system to the destination database system is distributed to at least two processing engines. The flow then moves to step 606, where at least one processing rule is retrieved. In step 608, at least one processing rule is applied to at least one record in the at least one destination database system. As a result of step 608, an access control mechanism associated with the at least one record is altered and the flow completes at 610.

CONCLUSION

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

What is claimed is:

1. A method for synchronizing access permissions across at least two disparate database systems, the method comprising:

queuing, into a work order queue, a plurality of work orders, each work order within the plurality of work orders comprising respective pre-defined synchronization rules and a respective sequence of a respective set of records stored in a source database system and a destination database system to be used for synchronizing access permissions between the source database system and the destination database system, wherein the source database system and the destination database system have distinct access control mechanisms associated therewith;

receiving, with a selected processing engine within a set of processing engines, a current work order from the work order queue, wherein the set of processing engines is separate from the source database system and the destination database system;

fetching, by the selected processing engine from the source database system in response to receiving the current work order and based upon the current work order, a current set of records, the current set of records being specified by the current work order and the current set of records having access permission rules assigned to the current set of records in the source database system, wherein the access permission rules are to be mapped to privileges to be assigned to records in the destination database system;

fetching, concurrently with the fetching by the selected processing engine, the current work order by a second processing engine, the second processing engine being different than the selected processing engine, wherein the selected processing engine and the second processing engine are each on a different processing node in a network and the selected processing engine and the second processing engine are selected in response to one of the processing nodes in the network having insufficient resources;

creating, with the selected processing engine in response to the fetching, a destination rule to be applied to the destination database system by mapping the access permission rules assigned to the current set of records in the source database system to the destination rule based upon at least one processing rule associated with the current set of records, the at least one processing rule defining a respective conversion mapping for access permission rules of the source database system to respective analogous access permission rules on the destination database system; and applying, with the selected processing engine, the destination rule to at least one record in the destination database system, thereby altering an access control mechanism associated with the at least one record.

2. The method according to claim 1, the method further comprising:

receiving, prior to receiving the current work order, at least one event from the source database system;

queuing along with the plurality of work orders, in response to receiving the at least one event, an event work order corresponding to the at least one event; and determining, based at least in part on the event received from the source database system, the selected processing engine in the set of processing engines that is to receive the current work order.

3. The method according to claim 2, wherein the event is at least one of:

a user deactivation;
a user activation;
a user group deactivation;
a user group activation;
a modified security descriptor;
a modified security level; and
a modified custodian.

4. The method according to claim 2, the method further comprising:

defining a predefined schedule specifying scheduled access control synchronization between the source database system and the destination database system, wherein the predefined schedule specifies a plurality of work orders to be received by at least one processing engines within the set of processing engines and is managed by a scheduler and work order dispatcher as part of an asynchronous parallel processing system for scheduling the set of processing engines, and wherein the receiving the plurality of work orders is also performed in response to an occurrence of the scheduled access control synchronization.

5. The method according to claim 4, wherein the predefined schedule is based on errors received while previously applying at least one processing rule to at least one record in the at least one destination database system.

6. The method according to claim 4, wherein a number of processing engines within the at least one processing engine is determined based upon an amount of database records in the source database to be synchronized.

7. The method according to claim 1, wherein
the source database system is a records management system; and
the destination database system is a content management system.

8. The method of claim 1, wherein the destination rule is created based upon combining the permissions associated with the current set of records with processing rules defined by XML formatted data.

9. A synchronization system for synchronizing access permissions across at least two disparate database systems, the synchronization system comprising:

a source database system having a first set of records with an access control mechanism for each record;

a destination database system communicatively coupled to the source database system, the destination database system having a second set of records with an access control mechanism for each record that differs from the control mechanism of the first set of records;

an asynchronous parallel processing system with a set of processing engines, the asynchronous parallel processing system adapted to:

queuing, into a work order queue, a plurality of work orders, each work order within the plurality of work orders comprising respective pre-defined synchronization rules and a respective sequence of a respective set of records stored in a source database system and a destination database system to be used for synchronizing access permissions between the source database system and the destination database system;

receiving, with a selected processing engine within the set of processing engines, a current work order from the work order queue, wherein the set of processing engines is separate from the source database system and the destination database system;

fetching, by the selected processing engine from the source database system in response to receiving the current work order and based upon the current work order, a current set of records, the current set of records being specified by the current work order and the current set of records having access permission rules assigned to the current set of records in the source database system, wherein the access permission rules are to be mapped to privileges to be assigned to records in the destination database system;

fetching, concurrently with the fetching by the selected processing engine, the current work order by a second processing engine, the second processing engine being different than the selected processing engine, wherein the selected processing engine and the second processing engine are each on a different processing node in a network and the selected processing engine and the second processing engine are selected in response to one of the processing nodes in the network having insufficient resources;

creating, with the selected processing engine in response to the fetching, a destination rule to be applied to the destination database system by mapping the access permission rules assigned to the current set of records in the source database system to the destination rule based upon at least one processing rule associated with the current set of records, the at least one processing rule defining a respective conversion mapping for access permission rules of the source database system to respective analogous access permission rules on the destination database system; and applying, with the selected processing engine, the self-contained processing rule to at least one record in the destination database system, thereby altering the access control mechanism associated with the record.

10. The synchronization system according to claim 9, further comprising:

an event processor adapted to receive, prior to receiving the current work order, at least one event from the source database system, and wherein the asynchronous parallel processing system is further adapted to:

queuing along with the plurality of work orders, in response to receiving the at least one event, an event work order corresponding to the at least one event; and determining, based at least in part on the event received from the source database system, the selected processing engine in the set of processing engines that is to receive the current work order.

11. A computer program product for synchronizing access permissions across at least two disparate database systems, the computer program product comprising:

a storage medium readable by a processing circuit and storing instructions for execution by the processing circuit for performing a method comprising:

queuing, into a work order queue, a plurality of work orders, each work order within the plurality of work orders comprising respective pre-defined synchronization rules and a respective sequence of a respective set of records stored in a source database system and a destination database system to be used for synchronizing access permissions between the source database system and the destination database system, wherein the source database system and the destination database system have distinct access control mechanisms associated therewith;

receiving, with a selected processing engine within a set of processing engines, a current work order from the work order queue, wherein the set of processing engines is separate from the source database system and the destination database system;

fetching, by the selected processing engine from the source database system in response to receiving the current work order and based upon the current work order, a current set of records, the current set of records being specified by the current work order and the current set of records having access permission rules assigned to the current set of records in the source database system, wherein the access permission rules are to be mapped to privileges to be assigned to records in the destination database system;

fetching, concurrently with the fetching by the selected processing engine, the current work order by a second processing engine, the second processing engine being different than the selected processing engine, wherein the selected processing engine and the second processing engine are each on a different processing node in a network and the selected processing engine and the second processing engine are selected in response to one of the processing nodes in the network having insufficient resources;

creating, with the selected processing engine in response to the fetching, a destination rule to be applied to the destination database system by mapping the access permission rules assigned to the current set of records in the source database system to the destination rule based upon at least one processing rule associated with the current set of records, the at least one processing rule defining a respective conversion mapping for access permission rules of the source database system to respective analogous access permission rules on the destination database system; and applying, with the selected processing engine, the destination rule to at least one record in the destination database system, thereby altering an access control mechanism associated with the at least one record.

12. The computer program product according to claim 11, the computer program product further comprising instructions for:

receiving, prior to receiving the current work order, at least one event from the source database system;

queuing along with the plurality of work orders, in response to receiving the at least one event, an event work order corresponding to the at least one event; and determining, based at least in part on the event received from the source database system, the selected processing engine in the set of processing engines that is to receive the current work order.

13. The computer program product according to claim 12, wherein the event is at least one of:

a user deactivation;
a user activation;
a user group deactivation;
a user group activation;
a modified security descriptor;
a modified security level; and
a modified custodian.

14. The computer program product according to claim 12, the computer program product further comprising instructions for:

defining a predefined schedule specifying scheduled access control synchronization between the source database system and the destination database system, wherein the predefined schedule specifies a plurality of work orders to be received by at least one processing engines within the set of processing engines and is managed by a scheduler and work order dispatcher as part of an asynchronous parallel processing system for scheduling the set of processing engines, and wherein the receiving the plurality of work orders is also performed in response to an occurrence of the scheduled access control synchronization.

15. The computer program product according to claim 14, wherein the predefined schedule is based on errors received while previously applying at least one processing rule to at least one record in the destination database system.

16. The computer program product according to claim 11, wherein a number of processing engines within the at least one processing engine is determined based upon an amount of database records in the source database to be synchronized.

17. The computer program product according to claim 11, wherein the destination rule is created based upon combining the permissions associated with the current set of records with processing rules defined by XML formatted data.

\* \* \* \* \*